(12) United States Patent
Kang et al.

(10) Patent No.: US 11,847,332 B2
(45) Date of Patent: Dec. 19, 2023

(54) DATA STORAGE APPARATUS AND OPERATING METHOD THEREOF

(71) Applicant: SK hynix Inc., Icheon (KR)

(72) Inventors: Hye Mi Kang, Icheon (KR); Eu Joon Byun, Icheon (KR)

(73) Assignee: SK hynix Inc., Icheon (KR)

( * ) Notice: Subject to any disclaimer, the term of this patent is extended or adjusted under 35 U.S.C. 154(b) by 61 days.

(21) Appl. No.: 17/516,392

(22) Filed: Nov. 1, 2021

(65) Prior Publication Data

US 2022/0276783 A1 Sep. 1, 2022

(30) Foreign Application Priority Data

Feb. 26, 2021 (KR) .................. 10-2021-0026222

(51) Int. Cl.
*G06F 3/00* (2006.01)
*G06F 3/06* (2006.01)

(52) U.S. Cl.
CPC ............ *G06F 3/064* (2013.01); *G06F 3/0604* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2019/0391916 A1* | 12/2019 | Hsieh | .................. G06F 12/0292 |
| 2020/0097403 A1 | 3/2020 | Saxena et al. | |
| 2020/0334142 A1* | 10/2020 | Danilov | .................. G06F 3/067 |

FOREIGN PATENT DOCUMENTS

| | | |
|---|---|---|
| KR | 1020190128392 A | 11/2019 |
| KR | 1020200073604 A | 6/2020 |
| KR | 1020200099882 A | 8/2020 |
| KR | 1020210092988 | 7/2021 |

* cited by examiner

*Primary Examiner* — Midys Rojas

(57) ABSTRACT

A data storage apparatus includes storage including a plurality of memory blocks and a controller configured to set an attribute of each of the memory blocks as a random memory block or a sequential memory block, and to manage validity of map data for data stored in each of the memory blocks using a map segment bitmap. The controller configures at least one memory block set by combining a set number of memory blocks, as a housekeeping event is triggered, and selects a victim block set from the at least one memory block set based on continuity of a logical address, or a number of valid map data, or both.

17 Claims, 13 Drawing Sheets

Figure 4:
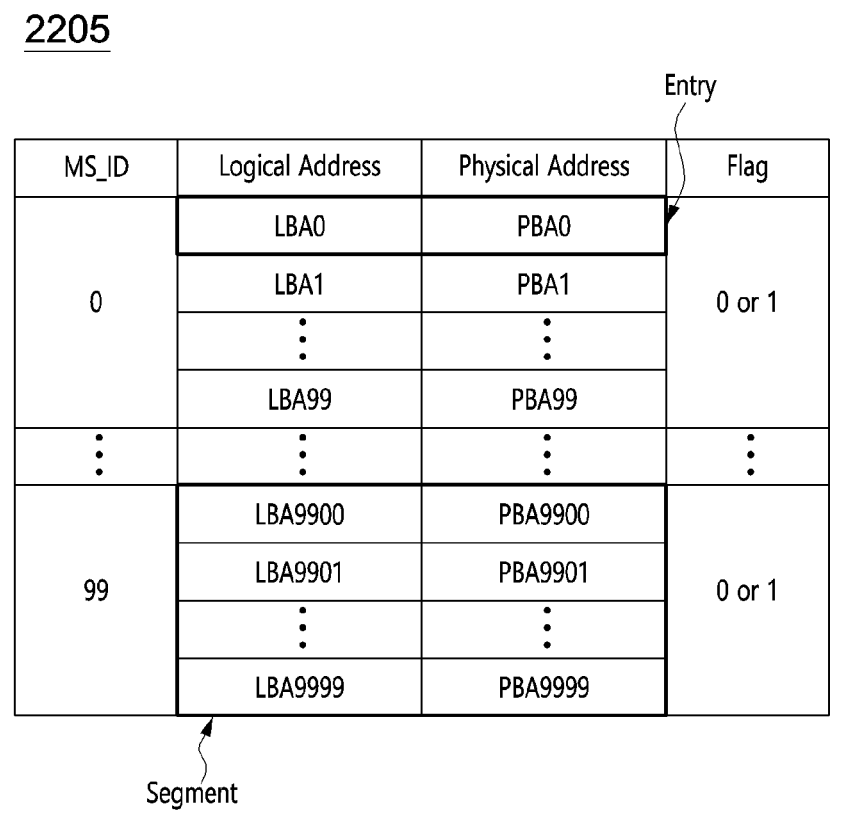

| MS_ID | Logical Address | Physical Address | Flag |
|---|---|---|---|
| 0 | LBA0 | PBA0 | 0 or 1 |
| | LBA1 | PBA1 | |
| | ⋮ | ⋮ | |
| | LBA99 | PBA99 | |
| ⋮ | ⋮ | ⋮ | ⋮ |
| 99 | LBA9900 | PBA9900 | 0 or 1 |
| | LBA9901 | PBA9901 | |
| | ⋮ | ⋮ | |
| | LBA9999 | PBA9999 | |

Entry

Segment

FIG. 5A

| Random Block Index | MSEGBTM |
|---|---|
| 0 | 0100/0001/0100/1100/0000 |
| 1 | 0000/0001/0110/0000/0000 |
| 2 | 0000/0001/1100/0000/0000 |
| 3 | 0000/0001/0000/0100/0000 |

FIG. 5B

| Random Block Index | Cross BTM | Count |
|---|---|---|
| 0-1 | 0100/0001/0110/1100/0000 | 6 |
| 0-2 | 0100/0001/1100/1100/0000 | 6 |
| 0-3 | 0100/0001/0100/1100/0000 | 5 |
| 1-2 | 0000/0001/1110/0000/0000 | 4 |
| 1-3 | 0000/0001/0110/0100/0000 | 4 |
| 2-3 | 0000/0001/1100/0100/0000 | 4 |

FIG. 6

Victim:Block 1

| 8 | X | 5 | 23 |
|---|---|----|----|
| X | X | 3 | 12 |
| 9 | X | 18 | 30 |
|   | 10 | 14 | X |

Victim:Block 2

| 4 | 2 | 28 | 15 |
|---|---|----|----|
| 0 | X | 20 | 13 |
| X | X | X | 11 |
| 6 | 7 | 21 | 24 |

Destination

| 0 | 1 | 2 | 3 |
|----|----|----|----|
| 4 | 5 | 6 | 7 |
| 8 | 9 | 10 | 11 |
| 12 | 13 | 14 | 15 |
| 18 | 20 | 21 | 23 |
| 24 | 28 | 30 |  |

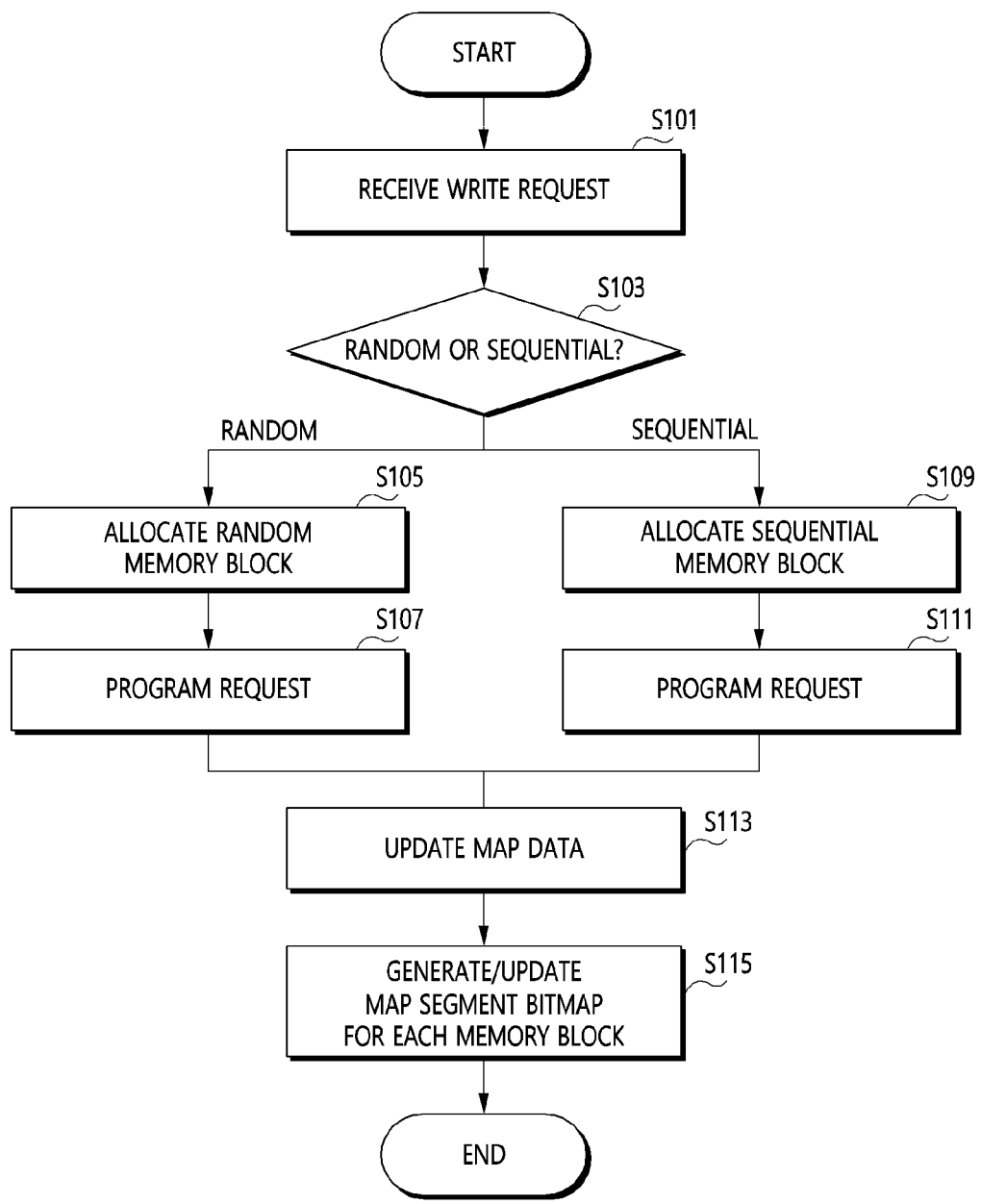

DATA STORAGE APPARATUS AND OPERATING METHOD THEREOF

CROSS-REFERENCES TO RELATED APPLICATION

The present application claims priority under 35 U.S.C. § 119(a) to Korean application number 10-2021-0026222, filed on Feb. 26, 2021, in the Korean Intellectual Property Office, which is incorporated herein by reference in its entirety.

BACKGROUND

1. Technical Field

Various embodiments may generally relate to a semiconductor integrated apparatus, and more particularly, to a data storage apparatus and an operating method thereof.

2. Related Art

Data storage apparatuses may use volatile memory devices or nonvolatile memory devices as storage media to perform data input/output (I/O) operations according to a request of a host apparatus.

As an example of a data storage medium, there are storage apparatuses using flash memory devices. With the increase in capacity and the improvement in price competitiveness according to technology development of the flash memory devices, the storage apparatuses using the flash memory devices may be employed in personal computers (PCs) or mobile apparatuses as well as data centers processing massive data.

Flash memory devices as one of nonvolatile memory devices may not perform overwriting or in-place updating and may have different read/write units from erase units. Accordingly, data input according to an overwrite request of a host apparatus may not be actually overwritten in the flash memory device and may be stored in another physical region other than a region in which previous data has been stored. Therefore, the flash memory devices need to manage storage spaces through a housekeeping operation such as garbage collection, data migration, and wear-levelling.

SUMMARY

In an embodiment of the present disclosure, a data storage apparatus may include: storage including a plurality of memory blocks and a controller configured to set an attribute of each of the memory blocks as a random memory block or a sequential memory block, and to manage validity of map data for data stored in each of the memory blocks using a map segment bitmap. The controller configures at least one memory block set by combining a set number of memory blocks, as a housekeeping event is triggered, and selects a victim block set from the at least one memory block set based on continuity of a logical address, or a number of valid map data, or both.

In an embodiment of the present disclosure, an operating method of a data storage apparatus which includes storage including a plurality of memory blocks and a controller configured to control the storage, the method comprising: setting, by the controller, an attribute of each of the memory blocks as a random memory block or a sequential memory block; managing, by the controller, validity of map data for data stored in each of the memory blocks as a map segment bitmap; configuring, by the controller, at least one memory block set by combining a set number of memory blocks, as a housekeeping event is triggered; and selecting, by the controller, a victim block set from the at least memory block set based on continuity of a logical address, or a number of valid map data, or both.

In an embodiment of the present disclosure, a data storage apparatus may include: storage including a plurality of memory blocks; and a controller configured to transmit and receive data to and from the storage in response to a request of a host apparatus, wherein the controller manages an attribute of each of the memory blocks as a random memory block or a sequential memory block based on continuity of a logical address for data stored in each of the memory blocks, generates a map segment bitmap for each of the memory blocks based on validity of map data for the data stored in each of the memory blocks, configures at least one memory block set by selecting a given number of memory blocks among random memory blocks, as a housekeeping event is triggered, and performs the housekeeping operation by selecting a memory block set having maximum continuity of a logical address from the at least one memory block set, as a victim block set.

These and other features, aspects, and embodiments are described in more detail below.

BRIEF DESCRIPTION OF THE DRAWINGS

The above and other aspects, features and beneficial aspects of the subject matter of the present disclosure will be more clearly understood from the following detailed description taken in conjunction with the accompanying drawings, in which:

FIG. 4 is a diagram illustrating a configuration of a map segment table according to an embodiment of the present disclosure;

FIG. 5A and FIG. 5B are diagrams illustrating a map segment bitmap and a cross bitmap according to an embodiment of the present disclosure;

FIG. 6 illustrates a garbage collection method using a victim block according to an embodiment of the present disclosure;

FIG. 7 is a flowchart explaining an operating method of a data storage apparatus according to an embodiment of the present disclosure.

DETAILED DESCRIPTION

Various embodiments of the present disclosure are described in detail with reference to the accompanying drawings. The drawings are schematic illustrations of various embodiments (and intermediate structures). As such, variations from the configurations and shapes of the illustrations as a result, for example, of manufacturing techniques and/or tolerances, may be possible. Thus, the described embodiments should not be construed as being limited to the particular configurations and shapes illustrated herein but may include deviations in configurations and shapes which do not depart from the spirit and scope of the present teachings as defined in the appended claims.

The present teachings are described herein with reference to cross-section and/or plan illustrations of idealized embodiments of the present teachings. However, embodiments of the present teachings should not be construed as limiting the present teachings. Although a few embodiments of the present teachings are shown and described, it will be appreciated by those of ordinary skill in the art that changes may be made in these embodiments without departing from the principles and spirit of the present teachings.

Figure 1:
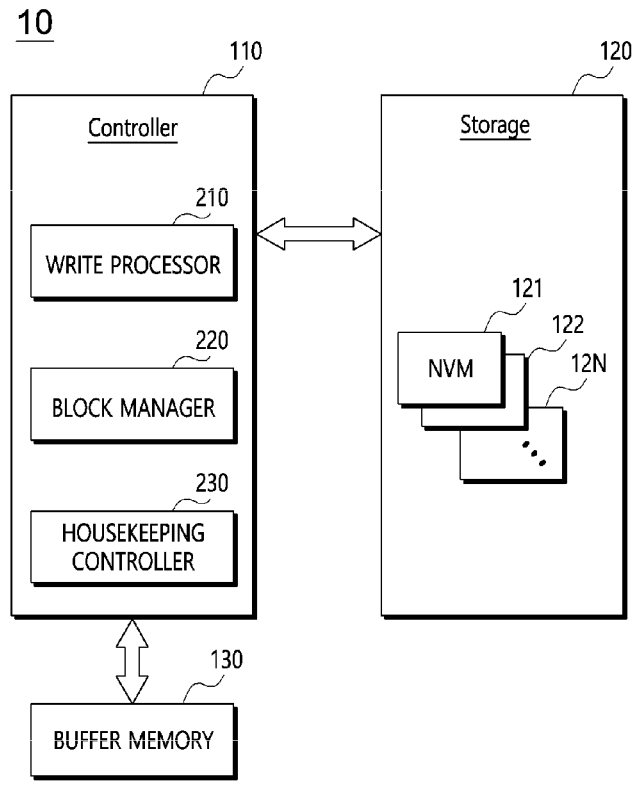
FIG. 1 is a diagram illustrating a configuration of a data storage apparatus according to an embodiment of the present disclosure.

FIG. 1 is a diagram illustrating a configuration of a data storage apparatus according to an embodiment.

Referring to FIG. 1, a data storage apparatus 10 according to an embodiment may include a controller 110, storage 120, and a buffer memory 130.

The controller 110 may control the storage 120 in response to a request of a host apparatus (not shown). For example, the controller 110 may control data to be programmed in the storage 120 in response to a write request of the host apparatus. The controller 110 may provide data written in the storage 120 to the host apparatus in response to a read request of the host apparatus.

The storage 120 may program data therein or output data programmed therein according to control of the controller 110. The storage 120 may be configured of a volatile memory device or a nonvolatile memory device. In an embodiment, the storage 120 may be implemented using a memory device selected among various nonvolatile memory devices such as an electrically erasable and programmable read only memory (EEPROM), a NAND flash memory, a NOR flash memory, a phase-change random access memory (PRAM), a Resistive RAM (ReRAM), a ferroelectric RAM (FRAM), a spin torque transfer magnetic RAM (STT-MRAM), and the like.

The storage 120 may include a plurality of nonvolatile memory devices (NVMs) 121 to 12N, and each of the nonvolatile memory devices 121 to 12N may include a plurality of dies, a plurality of chips, or a plurality of packages. Each of the plurality of dies may include at least one plane and each of planes may include a plurality of memory blocks. Each of the plurality of memory blocks may include a plurality of pages.

Further, the storage 120 may include a single-level cell (SLC) in which one-bit data is to be stored in one memory cell or an extra-level cell (XLC) in which multi-bit data is to be stored in one memory cell.

The buffer memory 130 may serve as a space which may temporarily store data to be transmitted and received when the data storage apparatus 10 performs a series of operations such as an operation of reading or writing data in connection with the host apparatus. Although it has been illustrated in FIG. 1 that the buffer memory 130 is located outside the controller 110, the buffer memory 130 may be located inside the controller 110. The buffer memory 130 may be controlled through a buffer manager (not shown).

The controller 110 may include a write processor 210, a block manger 220, and a housekeeping controller 230.

As the host apparatus transmits a write request including a logical address and write data, the write processor 210 may transmit a program command including a physical address corresponding to the logical address and the write data to the storage 120.

The block manager 220 may set an attribute of a memory block in which the write data is stored as a random memory block or a sequential memory block. The block manager 220 may represent validity of map data (for example, validity of a map segment) corresponding to data stored in each memory block, as a flag, and manage validity of total map segments as a map segment bitmap. The map segment may be map data management units of the controller 110. The map segment may include a plurality of map entries and each of the plurality of map entries may be mapping information between a unit logical address LBA used in the host apparatus and a unit physical address PBA used in the storage 120.

As a housekeeping event is triggered, the block manager 220 may configure at least one memory block set by combining the set number of memory blocks and select a victim block set (specifically, victim blocks) from the at least one memory block set based on continuity of the logical address and/or the number of valid data. For example, the block manager 220 may configure one or more memory block sets such that each of the memory block sets includes a given number (e.g., a predetermined number) of memory blocks, and select a victim block set from the configured memory block sets based on the continuity of the logical address, or the number of valid data, or both.

In an embodiment, the block manager 220 may configure the memory block set by combining non-overlapping random memory blocks by a preset number. Specifically, the preset number (or set number) may be determined based on the efficiency of recovering continuity and the computation cost of generating the cross bitmap. For example, as the preset number increases, the efficiency of recovering the continuity may increase, but the computation cost of generating the cross bitmap may also increase. Thus, the preset number may be determined to optimize such a trade-off between the efficiency and the computation cost. The number of memory blocks combined to configure the memory block set may correspond to the number of victim blocks to be selected. For example, the number of memory blocks included in the memory block set may be equal to the number of victim blocks in the selected victim block set. However, embodiments of the present disclosure are not limited thereto.

To select the victim blocks, the block manager 220 may configure a cross bitmap of each memory block set by performing a logic operation (e.g., an OR operation) on the map segment bitmaps of the memory blocks in the memory block set.

When any one of the map entries constituting the map segment is invalidated, the flag indicating validity of the corresponding map segment may be set as a first logic level (for example, logic low) or an invalid bit. When all the map entries constituting the map segment are valid, the flag indicating validity of the corresponding map segment may be set as a second logic level (for example, logic high) or a valid bit.

Accordingly, the block manager 220 may determine the continuity of the valid map data for each memory block set, which is may substantially correspond to the continuity of the valid logical address for each memory block set, based on the continuity of the valid bits included in the cross bitmap configured for each memory block set.

Further, the block manager 220 may determine the number of valid map data for each memory block set, which may substantially correspond to the number of valid data for each memory block set, based on the number of the valid bits included in the cross bitmap configured for each memory block set.

In an embodiment, the block manager 220 may determine continuity of the valid map segment through the cross bitmap and select a memory block set predicted to have high continuity of the logical address as the victim blocks based on a determination result. For example, the block manager 220 may select a memory block set having the highest degree of continuity of the logical address as a victim block set including victim blocks.

In an embodiment, the block manager 220 may select a memory block set predicted to have minimum valid mapping information and high continuity of the logical address as the victim blocks, based on the number of valid map segments in the cross bitmap.

As a housekeeping event such as garbage collection and wear-levelling is triggered, the housekeeping controller 230 may perform a housekeeping operation using the victim blocks determined in the block manager 220. In an embodiment, when the number of random memory blocks is equal to or larger than a given threshold value (e.g., a set threshold value), the garbage collection event as the housekeeping event is triggered, and the housekeeping controller 230 may copy the valid data in the victim blocks to a destination block to be collected and then erase the victim blocks so that the free blocks may be ensured. The housekeeping controller 230 may arrange the valid data in the victim blocks in ascending order or in descending order based on the logical address, and then copy the arranged valid data to the destination block so that the logical continuity of the moved data may be improved.

Figure 2:
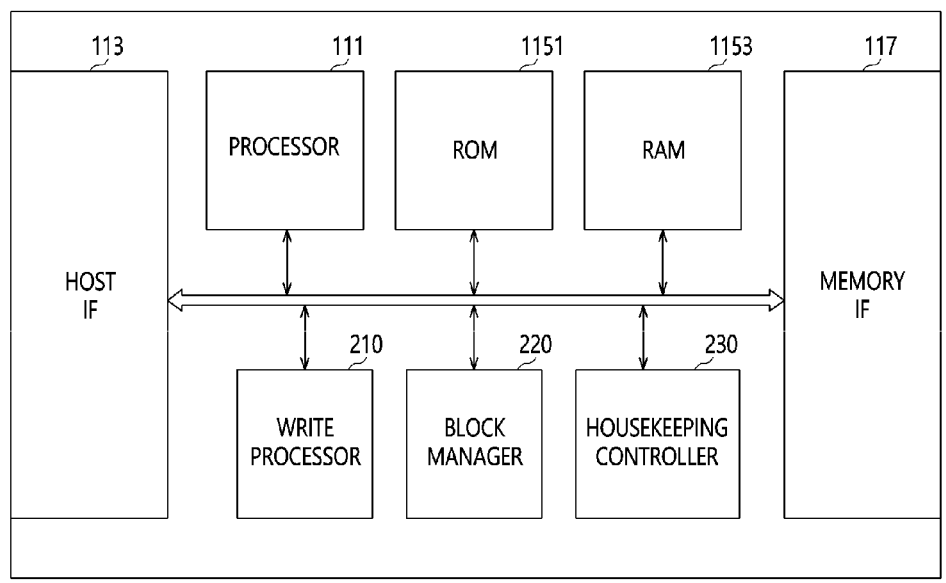
FIG. 2 is a diagram illustrating a configuration of a controller according to an embodiment of the present disclosure.

FIG. 2 is a configuration diagram of a controller according to an embodiment.

Referring to FIG. 2, the controller 110 according to an embodiment may include a processor 111, a host interface 113, a read only memory (ROM) 1151, a random access memory (RAM) 1153, a memory interface 117, the write processor 210, the block manager 220, and the housekeeping controller 230.

The processor 111 may be configured to transmit various control information required for a read or write operation of data from and in the storage 120 to other configurations including the host interface 113, the RAM 1153, and the memory interface 117. In an embodiment, the processor 111 may operate according to firmware provided for various operations of the data storage apparatus 10. In an embodiment, the processor 111 may perform a function of a flash translation layer (FTL) for managing the storage 120, such as garbage collection, address mapping, and wear-levelling, in connection with the block manager 220 and the housekeeping controller 230, a function of detecting and correcting errors of data read out from the storage 120, and the like.

The host interface 113 may receive a command and a clock signal from the host apparatus according to control of the processor 111 and provide a communication channel for controlling data input/output. In particular, the host interface 113 may provide a physical connection between the host apparatus and the data storage apparatus 10. The host interface 113 may provide interfacing between the data storage apparatus 10 and the host apparatus according to a bus format of the host apparatus. The bus format of the host apparatus may include at least one among standard interface protocols such as a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI-express (PCI-E) protocol, and a universal flash storage (UFS) protocol.

Program codes, for example, firmware or software required for an operation of the controller 110 may be stored in the ROM 1151. Code data and the like used by the program codes may also be stored in the ROM 1151.

The RAM 1153 may store data required for an operation of the controller 110 or data generated by the controller 110.

The memory interface 117 may provide a communication channel for signal transmission and reception between the controller 110 and the storage 120. The memory interface 117 may write data that has been temporarily stored in the buffer memory 130 in the storage 120, according to control of the processor 111. The memory interface 117 may transmit and temporarily store data read out from the storage 120 to and in the buffer memory 130.

Figure 3:
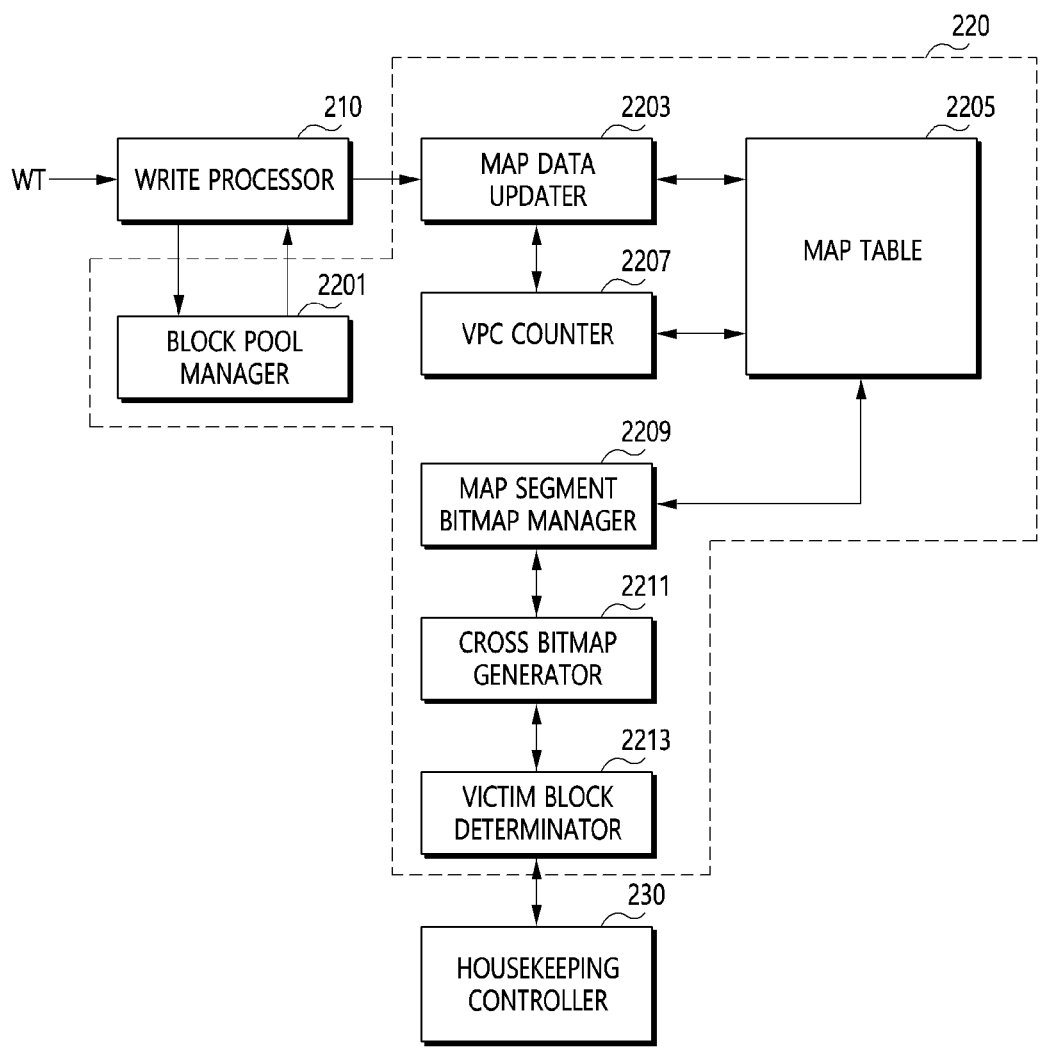
FIG. 3 is a diagram illustrating a configuration of a controller according to an embodiment of the present disclosure.

FIG. 3 is a detailed diagram illustrating a configuration of the block manager 220 which operates in connection with the write processor 210 and the housekeeping controller 230, according to an embodiment of the present disclosure.

Referring to FIG. 3, the block manager 220 may include a block pool manager 2201, a map data updater 2203, a map table 2205, a VPC (Valid Page Counter) counter 2207, a map segment bitmap manager 2209, a cross bitmap generator 2211, and a victim block determinator 2213.

As the host apparatus transmits the write request including the logical address and write data, the write processor 210 may request memory block allocation to the block manager 220.

Accordingly, the block pool manager 2201 of the block manager 220 may provide information for allocation of at least one memory block to the write processor 210, and set the attribute of the allocated memory block as the random memory block or the sequential memory block. The attribute of the memory block may be determined based on a workload of the host apparatus, for example, based on an offset of the logical address included in the write request of the host apparatus, but embodiments of the present disclosure are not limited thereto.

As the at least one memory block is allocated, the write processor 210 may transmit the program command to the storage 120.

The map data updater 2203 may manage the mapping information between the logical address provided from the write processor 210 and the physical address of a physical storage space constituting the storage 120. In an embodiment, the map data updater 2203 may configure the map segment by grouping unit map entries, each of which is mapping information between one logical address and one physical address, by set units. A set of map segments may be managed as the map table 2205. A position of each map segment in the map table 2205 may be managed as an index table.

The map table 2205 including the index table and the map segments may be stored in the storage 120. In booting of the data storage apparatus 10, the index table may be loaded into a working memory of the controller 110 to be referenced.

FIG. 4 is a diagram illustrating a configuration of a map table according to an embodiment.

Referring to FIG. 4, the map table 2205 may include a plurality of map segments MS_ID 0 to MS_ID 99. Each of the plurality of map segments MS_ID 0 to MS_ID 99 may include a plurality of physical addresses PBAx (e.g., x is a natural number from 0 to 99) corresponding to a plurality of addresses LBAx. When the mapping information between one logical address LBAx and one physical address PBAx is referred to as a map entry, each of the plurality of map segments MS_ID 0 to MS_ID 99 may include m (e.g., 100 in the embodiment of FIG. 4) map entries.

The map table 2205 may be stored in the storage 120, and in booting of the data storage apparatus 10, the map table 2205 may be loaded into the working memory of the controller 110 to be referenced.

The address mapping relationship of data stored in one memory block may be managed as at least one map segment, and the map segment bitmap manager 2209 may manage the validity of the map data of each memory block as a map segment bitmap MSEGBTM. As the data of the memory block are updated, the map segment bitmap may also be updated. In an embodiment, the map segment bitmap manager 2209 may be configured to manage the map segment bitmap MSEGBTM with respect to the random memory block.

The data stored in the memory blocks may be updated according to a request of the host apparatus. Accordingly, each of the memory blocks of the memory device which may not perform in-place updating may include a valid page and an invalid page.

The VPC counter 2207 in FIG. 3 may be configured to count the number of valid pages of each memory block with reference to the map table 2205.

As the housekeeping event is triggered, for example, as the number of random memory blocks is increased by a set threshold value or more, the cross bitmap generator 2211 may configure the memory block set by combining a set number of memory blocks. The cross bitmap generator 2211 may generate the cross bitmap by performing an OR logic operation on the map segment bitmaps of the memory blocks in each memory block set. In an embodiment, the cross bitmap generator 2211 may configure the memory block sets by combining non-overlapping random memory blocks by a set number regardless of order. The number of combined memory blocks may correspond to the number of victim blocks to be selected, but embodiments of the present disclosure are not limited thereto.

In an embodiment, the victim block determinator 2213 may select a memory block set predicted to have high continuity of the logical address by referring to the cross bitmap, as the victim block set, specifically the victim blocks. In another embodiment, the victim block determinator 2213 may select, as the victim blocks, a memory block set predicted to have the minimum number of valid map segments, which may substantially correspond to the minimum number of valid data, and high continuity of the logical address by referring to the cross bitmap.

The housekeeping controller 230 may perform the housekeeping operation such as garbage collection and wear-levelling by receiving allocation of the victim blocks from the block manager 220 as the housekeeping event is generated. In an embodiment, the housekeeping controller 230 may arrange the valid data in the victim blocks in ascending order or in descending order based on the logical address, and then copy the arranged valid data to the destination block so that the logical continuity of the moved data may be improved.

FIGS. 5A and 5B are illustrative diagrams of a map segment bitmap and a cross bitmap according to an embodiment.

It can be seen from FIG. 5A that the map segment bitmap MSEGBTM, as a set of flags, for each of the random memory blocks [index 0, 1, 2, 3] is generated through the map segment bitmap manager 2209. In the embodiment shown in FIG. 5A, each of four random memory blocks includes a plurality of map segments (e.g., 20 map segments), and the map segment bit map MSEGBTM of each of the random memory blocks has a plurality of values indicating validity of the plurality of map segments, respectively.

When the number of random blocks is increased to be equal to or greater than the set threshold value, and thus the garbage collection is triggered, the cross bitmap generator 2211 may configure the memory block sets by combining the non-overlapping random memory blocks by a set number regardless of order.

Referring to FIG. 5B, for example, when two victim blocks are selected, the block manager 220 may configure 6 memory block sets (0-1), (0-2), (0-3), (1-2), (1-3), and (2-3) by combining four random memory blocks of FIG. 5A by two without overlapping.

An operation of determining a victim block set including victim blocks based on continuity of a logical address through the block manager 220 will be described below.

When each of the memory block sets includes a first memory block and a second memory block, as shown in FIG. 5B, the cross bitmap Cross BTM of each (e.g., the memory block set (0-1)) of the memory block sets may be obtained by performing an OR operation on values (e.g., "0100/0001/0100/1100/0000") of the map segment bitmap MSEGBTM of the first memory block (e.g., the memory block 0) and those (e.g., "0000/0001/0110/0000/0000") of the map segment bitmap MSEGBTM of the second memory block (e.g., the memory block 1), respectively. From the cross bitmap Cross BTM of FIG. 5B, the memory block set (1-2) having the maximum number of sequential valid bits (logic high level) may be selected as the victim block set, specifically as victim blocks. Although not shown in FIG. 5B, when a plurality of memory block sets having the maximum number of sequential valid bits are detected, a memory block set having the minimum number of valid bits among the detected plurality of memory block sets may be selected as the victim block set.

An operation of determining a victim block set including victim blocks based on the number of valid map segments through the block manager 220 will be described below.

From the cross bitmap Cross BTM of FIG. 5B, the memory block sets (1-2), (1-3), and (2-3) having the minimum number of valid map segments, which may correspond to substantially the minimum number of valid data, may be detected as candidate block sets (or candidate victim block sets). When the desired number of victim blocks is two, the memory block set (1-2) predicted to have high continuity of the logical address, for example, the memory block set (1-2) having high continuity of the valid map segment among the candidate block sets (1-2), (1-3), and (2-3) may be selected as a final victim block set including random memory blocks [index 1,2]. This is because as the number of sequential valid bits (for example, logic high level "1") in the cross bitmap is increased, the continuity of the valid map segment may be predicted to be high.

FIG. 6 is an illustrative diagram explaining a garbage collection method using a victim block according to an embodiment. In the embodiment of FIG. 6, a memory block set including two victim blocks Victim:Block1 and Victim:Block2 may have been determined as a victim block set.

As a victim block Victim:Block1 and a victim block Victim:Block2 are selected through the block manager 220, the housekeeping controller 230 may arrange valid map segments of two victim blocks in ascending order or in descending order and copy the arranged valid map segments to the destination block Destination. The housekeeping controller 230 may erase the two victim blocks to ensure the free blocks.

The block manager 220 may select the victim blocks having the high continuity of the logical address and further having the minimum number of valid data, or the victim blocks having the minimum number of valid data and further having the high continuity of the logical address, and the housekeeping controller 230 may arrange the logical addresses of the valid data in the victim blocks and move the arranged logical addresses of the valid data in the victim blocks to the destination block, so that the logical continuity of the data in the destination block may be ensured. In an embodiment, the block manger 220 may select a victim block set including victim blocks that have the highest degree of continuity of the logical address (e.g., the same maximum number of sequential valid bits in the cross bitmap Cross BTM). When two or more memory block sets have the same degree of the high continuity, a memory block set having the minimum number of valid data (e.g., the minimum number of valid map segments in the cross bit map Cross BTM) may be selected among the two or more memory block sets as the victim block. In an embodiment, the block manager 220 may select a victim block set including victim blocks that have the minimum number of valid data. When two or more memory block sets have the same minimum number of valid data, a memory block set having the highest degree of continuity of the logical address may be selected among the two or more memory block sets as the victim block.

FIG. 7 is a flowchart explaining a memory block management method in an operating method of a data storage apparatus according to an embodiment.

Referring to FIG. 7, as the host apparatus transmits a write request including a logical address and write data, the controller 110 may receive the write request from the host apparatus (S101) and determine whether or not the write data is random data or sequential data based on continuity of the logical address included in the write request (S103).

When the write request is a write request for the random data, the controller 110 may set an attribute of a memory block allocated to store the write data as the random memory block (S105), and transmit a program command to the storage 120 (S107). When the write request is a write request for the sequential data, the controller 110 may set the attribute of the memory block allocated to store the write data as the sequential memory block (S109), and transmit a program command to the storage 120 (S111).

The controller 110 may generate map data which is a mapping relationship between the logical address included in the write request and the physical address used in the storage 120 and store the generated map data in the map table (S113).

Then, the controller 110 may generate information indicating validity of the map data for each memory block as the map segment bitmap MSEGBTM (S115). As the data of the memory block are updated, the map segment bitmap may also be updated. In an embodiment, the controller 110 may manage the map segment bitmap MSEGBTM for the random memory block other than the sequential memory block.

Figure 8A:
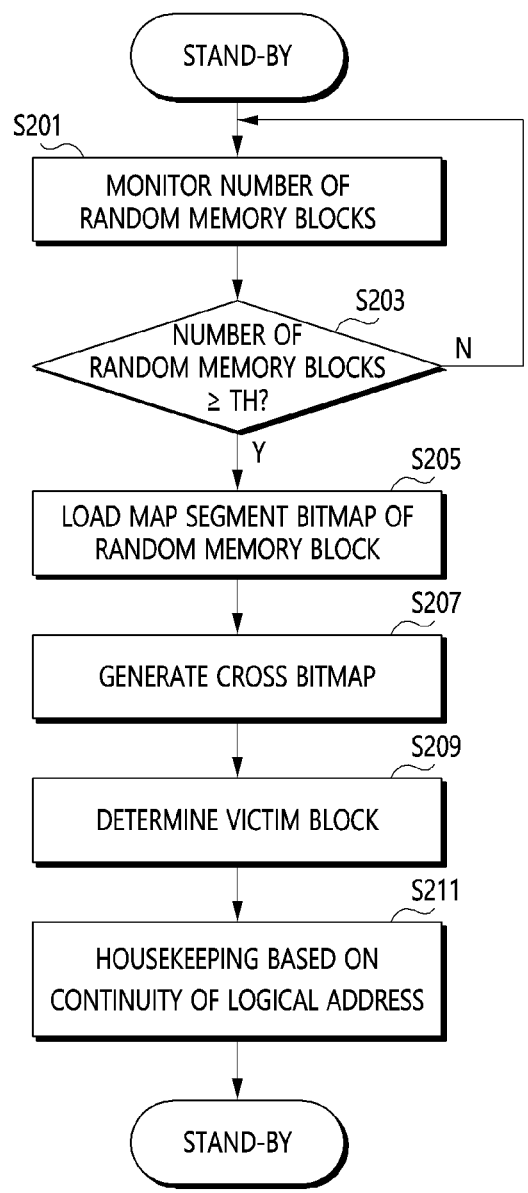
FIGS. 8A, 8B, and 8C are flowcharts each explaining an operating method of a data storage apparatus according to an embodiment of the present disclosure.
Figure 8B:
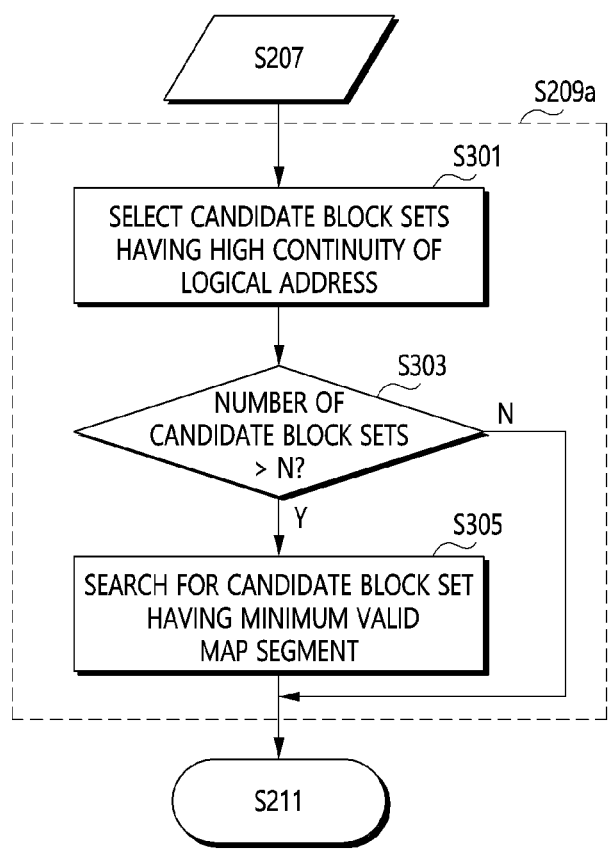
Figure 8C:
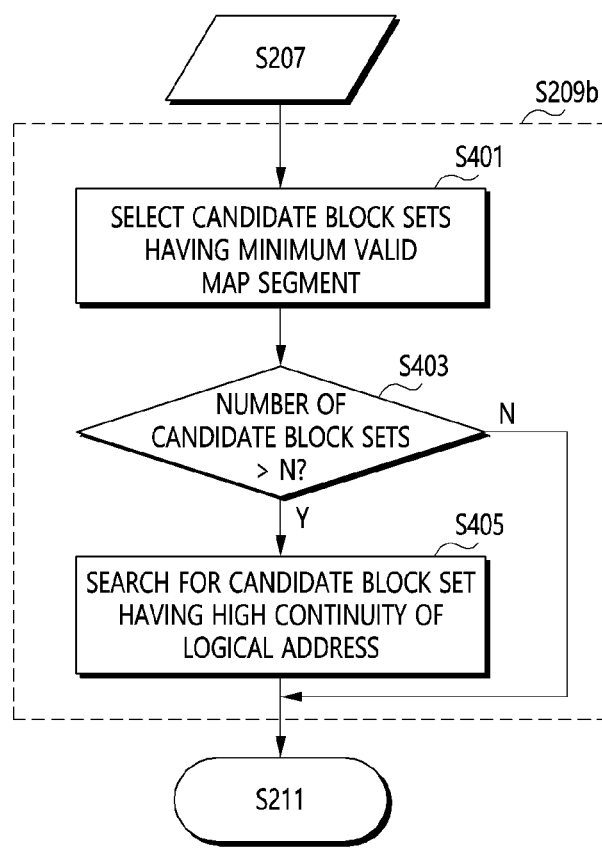

FIGS. 8A to 8C are flowcharts explaining a victim block selection method according to an embodiment.

Referring to FIG. 8A, the controller 110 may monitor the number of random memory blocks (S201), and determine whether or not the number of random memory blocks is equal to or larger than a set threshold value based on a monitoring result (S203). When it is determined that the number of random memory blocks is less than the set threshold value as a determination result (S203:N), the controller 110 may continuously monitor the number of random memory blocks (S201).

When it is determined that the number of random memory blocks is equal to or larger than the set threshold value as the determination result (S203:Y), the housekeeping event, for example a garbage collection event may be triggered, and the controller 110 may load the map segment bitmap of the memory blocks, specifically the map segment bitmaps of the random memory blocks thereinto (S205).

The controller 110 may combine the set number of memory blocks to configure memory block sets, and perform an OR operation on the map segment bitmaps of the memory blocks in each memory block set to generate a cross bitmap (S207). In an embodiment, the controller 110 may configure the memory block sets by combining the random memory blocks among the memory blocks by a set number. In an embodiment, the controller 110 may configure the memory block sets by combining non-overlapping random memory blocks by the set number regardless of order, and the number of combined memory blocks may correspond to the number of victim blocks to be selected, but embodiments of the present disclosure are not limited thereto.

The controller 110 may determine the victim blocks based on at least one of the continuity of the logical address and the number of valid data by referring to the cross bitmap of each memory block set (S209). For example, the controller 110 may determine the victim blocks based on the continuity of the logical address, or the number of valid data, or both, by referring to the cross bitmap of each memory block set (S209).

When the victim blocks are determined, the controller 110 may perform the housekeeping operation such as garbage collection and wear-levelling (S211). For example, the controller 110 may arrange the valid data in the victim blocks in ascending order or in descending order based on the logical address and copy the arranged valid data to the destination block, so that the continuity of moved data may be improved.

FIGS. 8B and 8C illustrate examples of the victim block determination process (S209) illustrated in FIG. 8A.

FIG. 8B is a flowchart explaining a method of determining the victim blocks based on the continuity of the logical address according to an embodiment.

Referring to FIG. 8B, the controller 110 may detect a memory block set predicted to have high continuity of the logical address (e.g., high continuity of the valid map segment) as a candidate block set by referring to the cross bitmaps (S301).

The controller 110 may determine whether or not the number of candidate block sets is larger than a first number (S303). When it is determined that the number of detected candidate block sets is equal to or smaller than the first number (S303:N), the controller 110 may determine the candidate block set as the final victim block set, specifically the final victim blocks, and perform the housekeeping operation (S211).

When it is determined that the number of detected candidate block sets is larger than the first number (S303:Y), the controller 110 may determine a memory block set having the minimum number of valid bitmap segments, which may correspond to substantially a memory block set having the minimum number of valid data among the candidate block sets, as the final victim block set, specifically the final victim blocks, based on the cross bitmaps (S305) and then perform the housekeeping operation (S211).

In an embodiment, the first number may correspond to the number of victim block sets.

FIG. 8C is a flowchart explaining a method of determining the victim blocks based on the number of valid map segments, substantially the number of valid data according to an embodiment.

Referring to FIG. 8C, the controller 110 may detect a memory block set having the minimum number of valid map segments as a candidate block set by referring to the cross bitmaps (S401).

The controller 110 may determine whether or not the number of candidate block sets is larger than the first number (S403). When it is determined that the number of detected candidate block sets is equal to or smaller than the first number (S403:N), the controller 110 may determine the candidate block set as the final victim block set, specifically the final victim blocks, and perform the housekeeping operation (S211).

When it is determined that the number of detected candidate block sets is larger than the first number (S403:Y), the controller 110 may determine a memory block set predicted to have high continuity of the logical address, for example, a memory block set having high continuity of the valid map segment among the candidate block sets, as the final victim block set, specifically the final victim blocks, based on the cross bitmaps (S405) and then perform the housekeeping operation (S211).

In an embodiment, the first number may correspond to the number of victim block sets.

Figure 9:
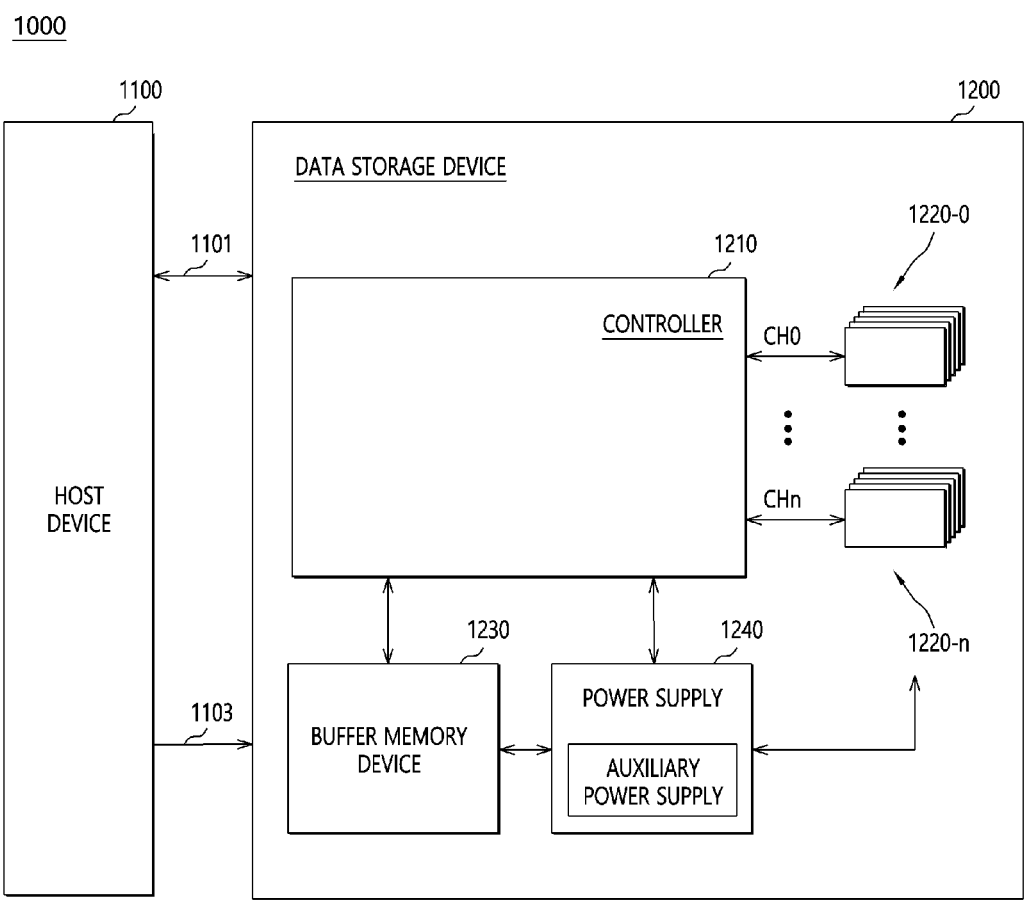
FIG. 9 is a diagram illustrating a data storage system in accordance with an embodiment.

FIG. 9 is a diagram illustrating a data storage system 1000, in accordance with an embodiment.

Referring to FIG. 9, the data storage system 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 10:
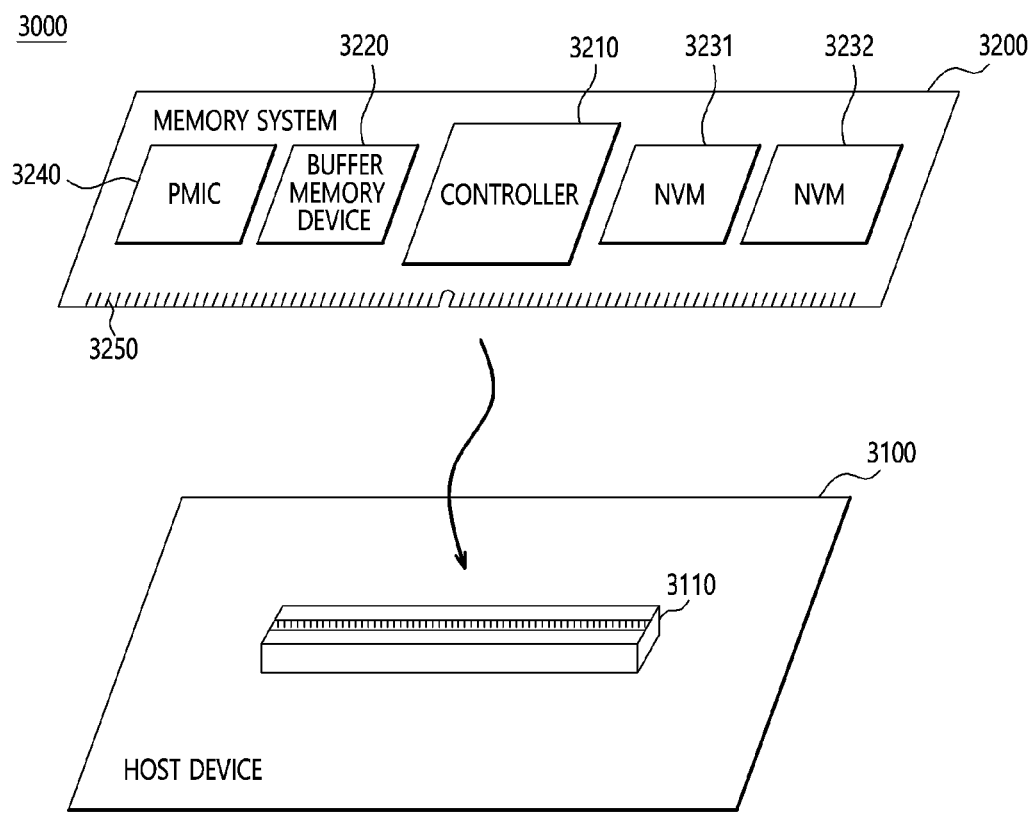
FIG. 10 and FIG. 11 are diagrams each illustrating a data processing system in accordance with an embodiment.

FIG. 10 is a diagram illustrating a data processing system 3000, in accordance with an embodiment. Referring to FIG. 10, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in substantially the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 11:
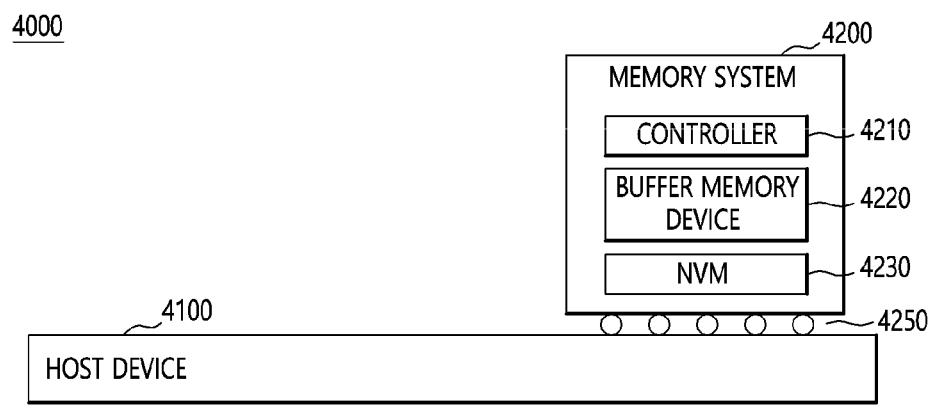

FIG. 11 is a diagram illustrating a data processing system 4000 in accordance with an embodiment. Referring to FIG. 11, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in substantially the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 12:
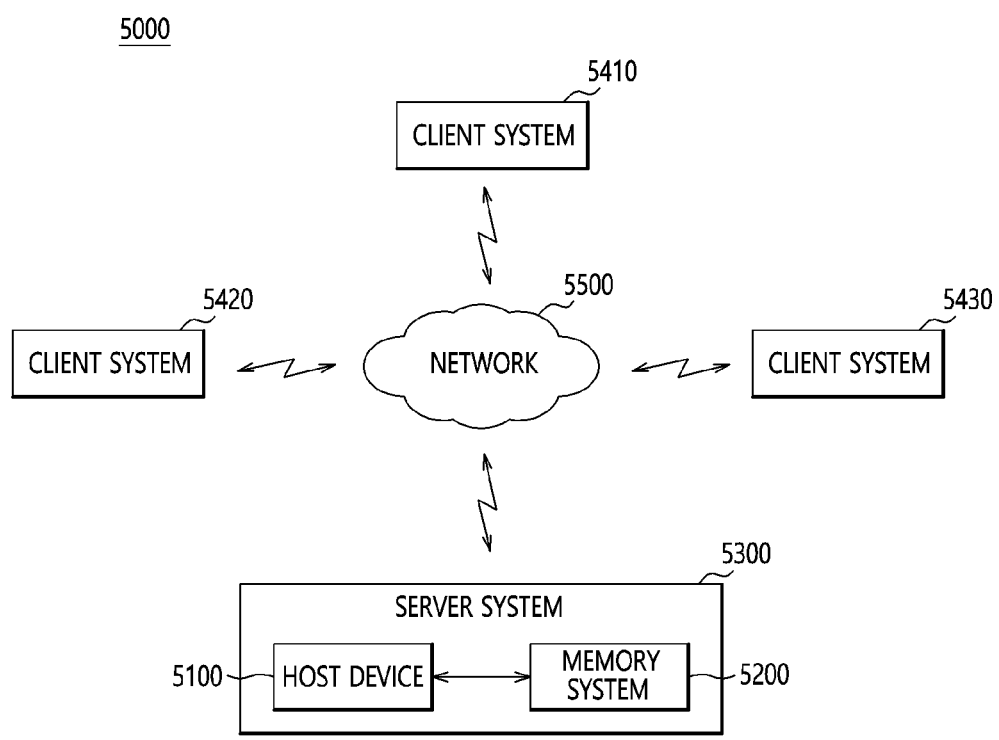
FIG. 12 is a diagram illustrating a network system including a data storage device in accordance with an embodiment.

FIG. 12 is a diagram illustrating a network system 5000 including a data storage device, in accordance with an embodiment. Referring to FIG. 12, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the data storage apparatus 10 shown in FIG. 1, the data storage device 1200 shown in FIG. 9, the memory system 3200 shown in FIG. 10, or the memory system 4200 shown in FIG. 11.

Figure 13:
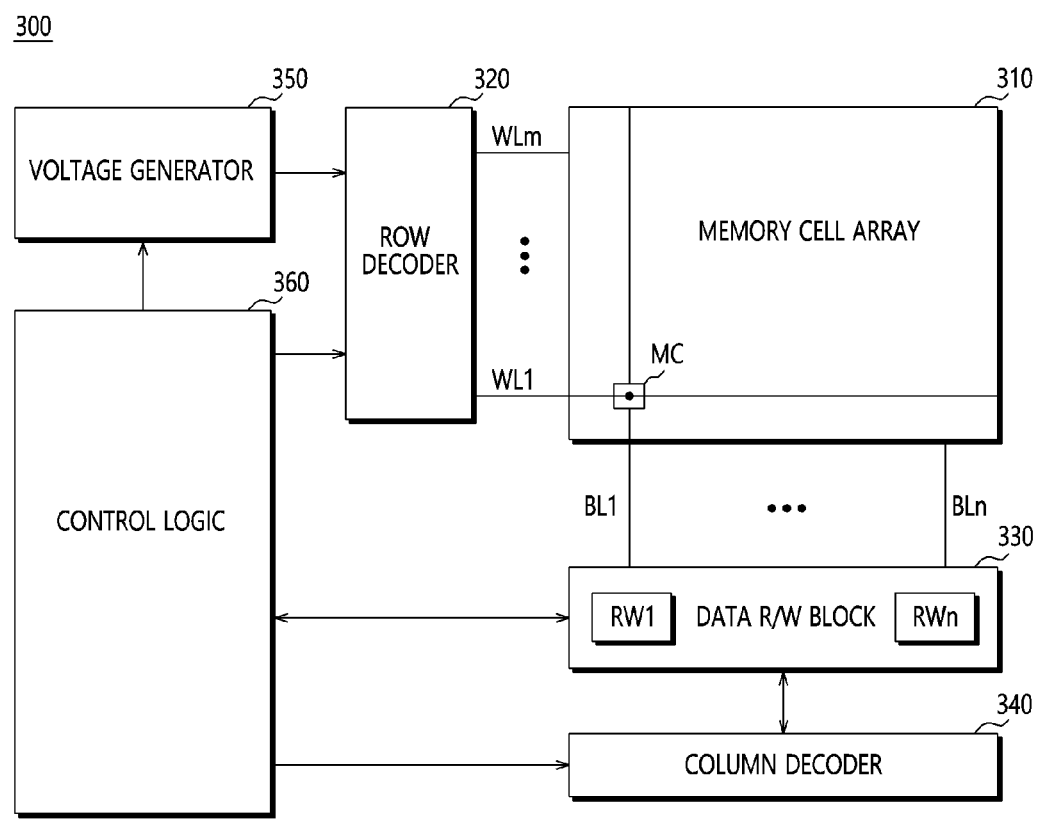
FIG. 13 is a block diagram illustrating a nonvolatile memory device included in a data storage device in accordance with an embodiment.

FIG. 13 is a block diagram illustrating a nonvolatile memory device 300 included in a data storage device, such as the data storage device 10, in accordance with an embodiment. Referring to FIG. 13, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

The above-described embodiments of the present disclosure are intended to illustrate and not to limit embodiments of the present disclosure. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A data storage apparatus comprising:
   storage including a plurality of memory blocks; and
   a controller configured to set an attribute of each of the memory blocks as a random memory block or a sequential memory block, and to manage validity of map data for data stored in each of the memory blocks using a map segment bitmap,
   wherein the controller configures at least one memory block set by combining a set number of memory blocks, as a housekeeping event is triggered, and selects a victim block set from the at least one memory block set based on continuity of a logical address, or a number of valid map data, or both,
   wherein the controller is further configured to generate a cross bitmap by performing a logical OR operation on map segment bitmaps of the set number of memory blocks in each of the memory block sets, and to determine the continuity of the logical address based on continuity of valid bits in the cross bitmap or determine the number of valid map data in the cross bitmap.

2. The data storage apparatus of claim 1, wherein the controller is further configured to detect one or more memory block sets having maximum continuity of the logical address and to, when a plurality of memory block sets are detected, select the victim block set among the detected memory block sets by additionally determining the number of valid map data.

3. The data storage apparatus of claim 1, wherein the controller determines the number of valid map data based on a number of valid bits in the cross bitmap.

4. The data storage apparatus of claim 3, wherein the controller is further configured to detect one or more memory block sets having a minimum number of valid map data, and to, when a plurality of memory block sets are detected, select the victim block set among the detected memory block sets by additionally determining the continuity of the logical address.

5. The data storage apparatus of claim 1, wherein the controller is configured to generate the map segment bitmap for the random memory block.

6. The data storage apparatus of claim 1, wherein the housekeeping event includes a garbage collection event, and the garbage collection event is triggered when a number of random memory blocks is equal to or larger than a given threshold value.

7. The data storage apparatus of claim 1, wherein the controller configures the at least one memory block set by combining the set number of non-overlapping random memory blocks regardless of order, as the housekeeping event is triggered.

8. An operating method of a data storage apparatus, wherein the apparatus includes storage including a plurality of memory blocks and a controller configured to control the storage, the method comprising:
   setting, by the controller, an attribute of each of the memory blocks as a random memory block or a sequential memory block;
   managing, by the controller, validity of map data for data stored in each of the memory blocks as a map segment bitmap;
   configuring, by the controller, at least one memory block set by combining a set number of memory blocks, as a housekeeping event is triggered; and
   selecting, by the controller, a victim block set from the at least memory block set based on continuity of a logical address, or a number of valid map data, or both,
   wherein the selecting of the victim block set includes:
      generating, by the controller, a cross bitmap by performing a logical OR operation on map segment bitmaps of the set number of memory blocks in each of the memory block sets; and
      determining, by the controller, the continuity of the logical address based on continuity of valid bits in the cross bitmap or determining, by the controller, the number of valid map data in the cross bitmap.

9. The method of claim 8, wherein the selecting of the victim block set further includes:
   detecting, by the controller, one or more memory block sets having maximum continuity of the logical address; and
   selecting, by the controller, when a plurality of memory block sets are detected, the victim block set among the detected memory block sets by additionally determining the number of valid map data.

10. The method of claim 8, wherein
    the number of valid map data is determined based on a number of valid bits in the cross bitmap.

11. The method of claim 10, wherein the selecting of the victim block set further includes:
    detecting, by the controller, one or more memory block sets having minimum valid map data; and
    selecting, by the controller, when a plurality of memory block sets are detected, the victim block set among the detected memory block sets by additionally determining the continuity of the logical address.

12. The method of claim 8, wherein the map segment bitmap is generated with respect to the random memory block.

13. The method of claim 8, wherein the housekeeping event includes a garbage collection event, and the garbage collection event is triggered when a number of random memory blocks is equal to or larger than a given threshold value.

14. The method of claim 8, wherein the configuring of the at least one memory block set includes configuring, by the controller, the at least one memory block set by selecting the set number of non-overlapping random memory blocks regardless of order.

15. A data storage apparatus comprising:
    storage including a plurality of memory blocks; and
    a controller configured to transmit and receive data to and from the storage in response to a request of a host apparatus,
    wherein the controller manages an attribute of each of the memory blocks as a random memory block or a sequential memory block based on continuity of a logical address for data stored in each of the memory blocks, generates a map segment bitmap for each of the memory blocks based on validity of map data for the data stored in each of the memory blocks, configures at least one memory block set by selecting a given number of memory blocks among random memory blocks, as a housekeeping event is triggered, and performs the housekeeping operation by selecting a memory block set having maximum continuity of a logical address from the at least one memory block set, as a victim block set, wherein the controller is further configured to generate a cross bitmap by performing a logical OR operation on map segment bitmaps of the given number of memory blocks in each of the at least one memory block set and determine the continuity of the logical address based on continuity of valid bits in the cross bitmap.

16. The data storage apparatus of claim 15, wherein the controller is further configured to, when a plurality of memory block sets having the maximum continuity of the logical address are detected, select a memory block set having a minimum number of valid map data among the detected memory block sets, as the victim block set.

17. The data storage apparatus of claim 15, wherein the controller is further configured to arrange data included in victim blocks of the victim block set based on the logical address and copy the arranged data to a destination block.

* * * * *